(12) United States Patent  
Madhavan et al.

(10) Patent No.: US 7,805,441 B2
(45) Date of Patent: Sep. 28, 2010

(54) VERTICAL SEARCH EXPANSION, DISAMBIGUATION, AND OPTIMIZATION OF SEARCH QUERIES

(75) Inventors: Anand Madhavan, Sunnyvale, CA (US); Matthew Carinio, San Luis Obispo, CA (US); Darshan Kantak, Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 287 days.

(21) Appl. No.: 11/370,258

(22) Filed: Mar. 6, 2006

(65) Prior Publication Data
US 2007/0208724 A1 Sep. 6, 2007

(51) Int. Cl.
*G06F 17/30* (2006.01)
(52) U.S. Cl. .......... 707/728; 707/713; 707/731
(58) Field of Classification Search .......... 707/4, 707/5, 3, 999.003, 999.004, 999.005, 713, 707/728, 731
See application file for complete search history.

(56) References Cited

U.S. PATENT DOCUMENTS

| | | | |
|---|---|---|---|
| 6,078,866 A | 6/2000 | Buck et al. | |
| 6,338,055 B1 | 1/2002 | Hagmann et al. | |
| 6,408,294 B1 | 6/2002 | Getchius et al. | |
| 6,460,029 B1 | 10/2002 | Fries et al. | |
| 7,213,027 B1 | 5/2007 | Kominek et | |
| 2004/0044571 A1 | 3/2004 | Bronnimann et al. | |
| 2004/0243568 A1 | 12/2004 | Wang et al. | |
| 2004/0267806 A1 | 12/2004 | Lester | |
| 2005/0071325 A1 | 3/2005 | Bem | |
| 2005/0080772 A1* | 4/2005 | Bem | 707/3 |
| 2005/0080775 A1 | 4/2005 | Colledge et al. | |
| 2005/0144064 A1 | 6/2005 | Calabria et al. | |
| 2005/0222901 A1 | 10/2005 | Agarwal et al. | |
| 2006/0230035 A1* | 10/2006 | Bailey et al. | 707/5 |
| 2007/0038614 A1 | 2/2007 | Guha | |
| 2007/0203903 A1* | 8/2007 | Attaran Rezaei et al. | 707/5 |
| 2007/0214132 A1* | 9/2007 | Grubb et al. | 707/5 |
| 2008/0027812 A1* | 1/2008 | Hsu et al. | 705/14 |

FOREIGN PATENT DOCUMENTS

| | | |
|---|---|---|
| KR | 10-2000-0049411 A | 8/2000 |
| WO | WO 2005/070111 A2 | 8/2005 |

OTHER PUBLICATIONS

International Search Report for the related foreign application PCT/US2007/005473.

* cited by examiner

*Primary Examiner*—James Trujillo
*Assistant Examiner*—Bruce M Moser
(74) *Attorney, Agent, or Firm*—Stattler-Suh PC

(57) ABSTRACT

A system and method to facilitate expansion, disambiguation, and optimization of search queries over a network wherein an original query received from a user is parsed to obtain at least one query term. A plurality of keywords related contextually to one or more query terms are further retrieved from a database. Finally, a set of modified queries is generated, each modified query further comprising at least one query term and at least one retrieved keyword.

17 Claims, 10 Drawing Sheets

900 910 920

(Y!) MUSIC   Sign In [New User? Sign Up]   SEARCH MUSIC  All ▽   GO▷   Yahoo! Music Home  Help LAUNCHcast RADIO   MUSIC VIDEOS   Y! MUSIC UNLIMITED   ARTISTS YAHOO! MUSIC UNLIMITED   RADIO   🎧 Create Station Select a station below
Today's Big Hits
Reggae
Dance
Browse all radio stations >

ARTIST SPOTLIGHT
EXCLUSIVE SONG

Kevin Federline - PopoZao
Hear K-Fed's new jam right here!

More Artist Spotlights... ▽

What's the best party video? According to your votes, it's "Dance, Dance." Now vote in our new poll, for best new band of 2006!

MUSIC VIDEOS
Top Yahoo! Music
Video Premieres of 2005

"We Belong Together"

Browse All Videos >

MUSIC NEWS

Arlo Guthrie Becomes Hurricane Troubadour
Dec 31 2005 10:51PM

Tom Jones Receives Knighthood From Britain
Dec 31 2005 2:10PM

Rapper Obie Trice Shot on Detroit Freeway
Dec 31 2005 7:44AM

Murder Charges Against Rapper Mane Dropped
Dec 30 2005 9:02PM

More News >

COOL STUFF

REVIEWS
Morningwood:

TODAY'S FEATURES

COVER ART
See Natasha Bedingfield Perform Maroon 5's "This Love"
Only at *Pepsi Smash* on *Yahoo! Music*.
More... >

You voted...we listened! Now see the latest winner, TRIVIUM, perform just for you!

Relive 365 days of magic & mayhem here!

Watch his high-voltage

TOP 10 VIDEOS

1  Check On It
   Beyonce'

2  Laffy Taffy
   D4L

3  When I'm Gone
   Eminem

4  Grillz
   Nelly

5  My Humps
   Black Eyed Peas

6  Stickwitu
   Pussycat Dolls

7  Be Without You
   Mary J. Blige

VERTICAL SEARCH EXPANSION, DISAMBIGUATION, AND OPTIMIZATION OF SEARCH QUERIES

CROSS-REFERENCE TO RELATED APPLICATIONS

This application is related to U.S. patent application Ser. No. 11/370,246 filed concurrently herewith on Mar. 6, 2006, and entitled "Vertical Search Expansion, Disambiguation, and Optimization of Search Queries."

TECHNICAL FIELD

The present invention relates generally to the field of network-based communications and, more particularly, to a system and method to facilitate expansion, disambiguation, and optimization of search queries over a network, such as the Internet.

BACKGROUND OF THE INVENTION

The explosive growth of the Internet as a publication and interactive communication platform has created an electronic environment that is changing the way business is transacted. As the Internet becomes increasingly accessible around the world, users need efficient tools to navigate the Internet and to find content available on various websites.

In a typical content management system, users make requests for content, or search queries, such as, for example, published data available at various websites, and receive the requested content and additional content that may or may not be relevant to the requested content or to the specific user, such as, for example, advertising content associated with advertising entities having a presence on the Internet.

One approach to providing the requested content and additional content that is relevant to the request or search query received from the user is to manually create predefined associations between the requested content and the relevant content, resulting in specific interactive links in the basic content to the additional relevant content. Although this approach works well with systems having a small amount of content, it appears to be too cumbersome and inefficient for systems that store large amounts of data.

Another approach involves a hierarchical representation of the basic searchable content and the additional content, wherein all the searchable content and the additional content are represented by respective nodes in a common content taxonomy or, in the alternative, in corresponding content taxonomies. When the requested content is presented to the user, the server reads the node ID of the requested content and retrieves corresponding additional content that has a matching node ID. However, this approach does not appear to scale well for large bodies of content.

SUMMARY OF THE INVENTION

A system and method to facilitate expansion, disambiguation, and optimization of search queries over a network are described. An original query received from a user is parsed to obtain at least one query term. A plurality of keywords related contextually to one or more query terms are further retrieved from a database. Finally, a set of modified queries is generated, each modified query further comprising at least one query term and at least one retrieved keyword.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which:

FIGS. 8-10 illustrate exemplary interfaces to facilitate expansion, disambiguation, and optimization of search queries over the network;

DETAILED DESCRIPTION

Figure 1:
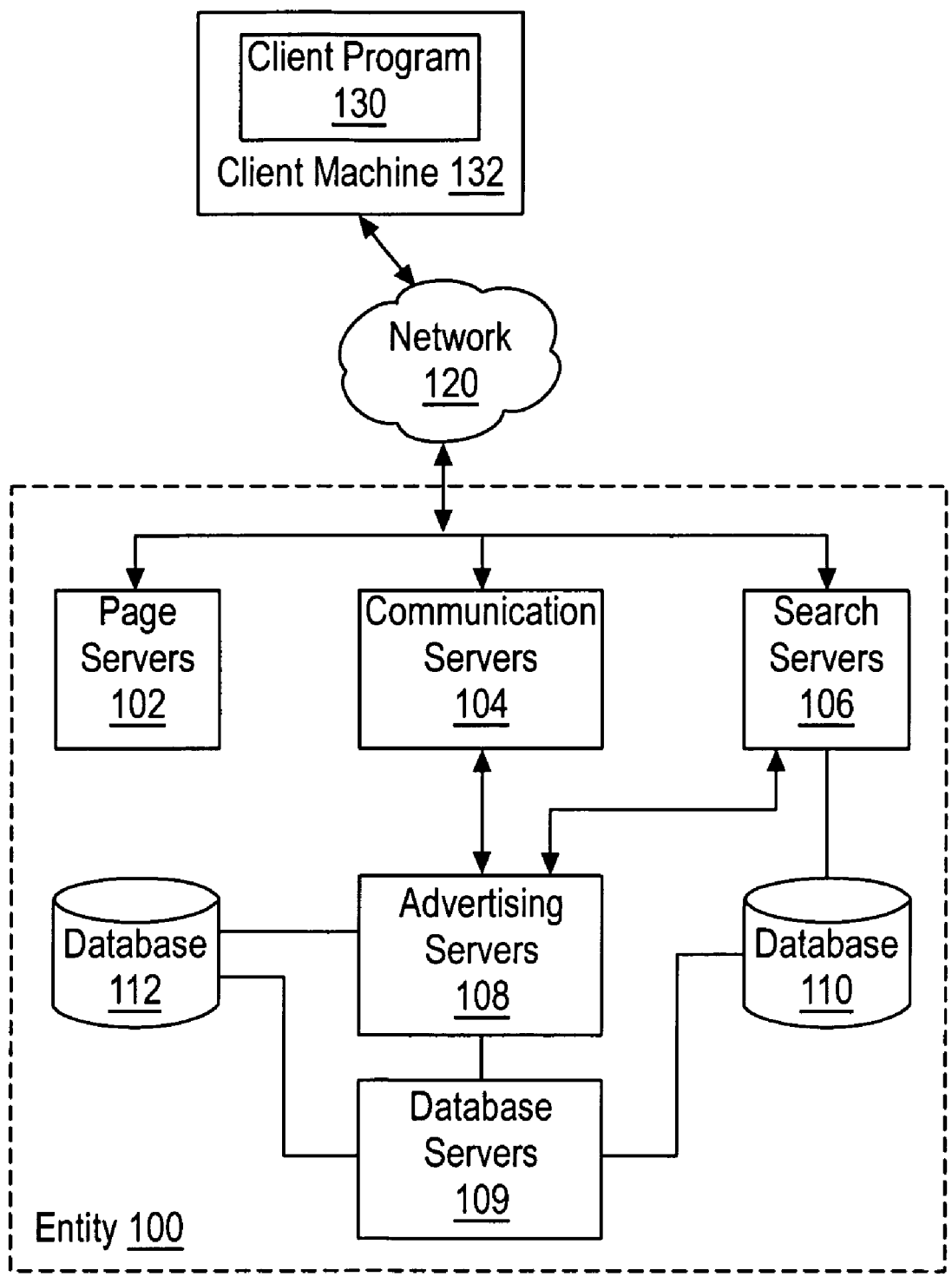
FIG. 1 is a block diagram illustrating an exemplary network-based entity, which facilitates expansion, disambiguation, and optimization of search queries, according to one embodiment of the invention.

FIG. 1 is a block diagram illustrating an exemplary network-based entity, which facilitates expansion, disambiguation, and optimization of search queries. While an exemplary embodiment of the present invention is described within the context of a entity enabling expansion, disambiguation, and optimization of search queries, it will be appreciated by those skilled in the art that the invention will find application in many different types of computer-based, and network-based, entities, such as, for example, commerce entities, content portal entities, or other known entities having a presence on the network.

In one embodiment, the entity 100 includes one or more front-end web servers, namely, for example, page servers 102, which deliver web pages to multiple users, (e.g., markup language documents), search processing servers 106, which handle search requests to the entity 100, and communication servers 104 that provide, inter alia, automated communications to/from users of the entity 100, such as, for example, electronic mail (email) servers, which provide automated email communications to/from users, and/or real-time communication servers, such as servers providing instant messaging (IM) functionality. The entity 100 may also include any number of additional web servers (not shown), such as, for example, picture servers, which dynamically deliver images to be displayed within the web pages, and content servers, which dynamically deliver content information to the users, and other processing servers, which provide an intelligent interface to the back-end of the entity 100.

The entity 100 further includes one or more back-end servers, for example, advertising processing servers 108 and database servers 109, each of which maintaining and facilitating access to one or more respective database 110, 112. In one embodiment, the advertising servers 108 are coupled to the database 112 and are configured to select and transmit content, such as, for example, advertisements, sponsor links, integrated links, and other types of advertising content, to users via the network 120, and to process advertising offers received at the entity 100, as described in further detail below.

The network-based entity 100 may be accessed by a client program 130, such as a browser (e.g., the Internet Explorer browser distributed by Microsoft Corporation of Redmond, Wash.) that executes on a client machine 132 and accesses the entity 100 via a network 120, such as, for example, the Internet. Other examples of networks that a client may utilize to access the entity 100 includes a wide area network (WAN), a local area network (LAN), a wireless network (e.g., a cellular network), the Plain Old Telephone Service (POTS) network, or other known networks.

Figure 2:
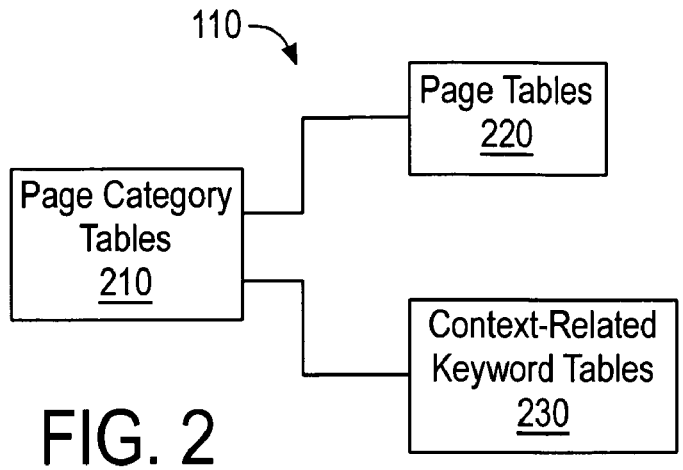
FIG. 2 is a block diagram illustrating an exemplary database, which at least partially implements and supports the network-based entity, according to one embodiment of the invention.

FIG. 2 is a block diagram illustrating an exemplary database, which at least partially implements and supports the network-based entity, according to one embodiment of the invention. In one embodiment, databases 110, 112 shown in FIG. 1 may be implemented as relational databases, and may include a number of tables having entries, or records, that are linked by indices and keys. Alternatively, the databases 110, 112 may be implemented as a collection of objects in an object-oriented database.

As illustrated in FIG. 2, the database 110 coupled to the search servers 106 includes multiple tables, of which tables specifically provided to enable an exemplary embodiment of the invention, namely page category tables 210, page tables 220, and context-related keyword tables 230, are shown. In one embodiment, the page category tables 210 may contain, for example, multiple categories used to group the web pages accessed by the entity 100 and/or by the user, the page tables 220 store web page information related to the web pages, and the context-related keyword tables 230 may contain, for example, keywords contextually related to each specific page category. In one embodiment, editors associated with the entity 100 enter the keywords in the tables 230 of the database 110. Alternatively, the keywords may be stored algorithmically. For example, a "MUSIC" page category stored within the tables 210 may be linked to various music-related web pages stored within the tables 220 and may also be linked to multiple keywords stored within the tables 230, such as, for example, "album," "CD," "DVD," "song," and other similar terms.

It is to be understood that the database 110 may include any of a number of additional tables, which may also be shown to be linked to the page category tables 210, the page tables 220, and the context-related keyword tables 230, such as, for example, content tables, which store content information related to the web pages, and/or user tables, which store records for each entity or user of the entity 100. Similarly, the database 112 coupled to the advertising servers 108 may also include multiple tables storing content information, which enable functionality of the advertising servers 108 within the entity 100.

Figure 3:
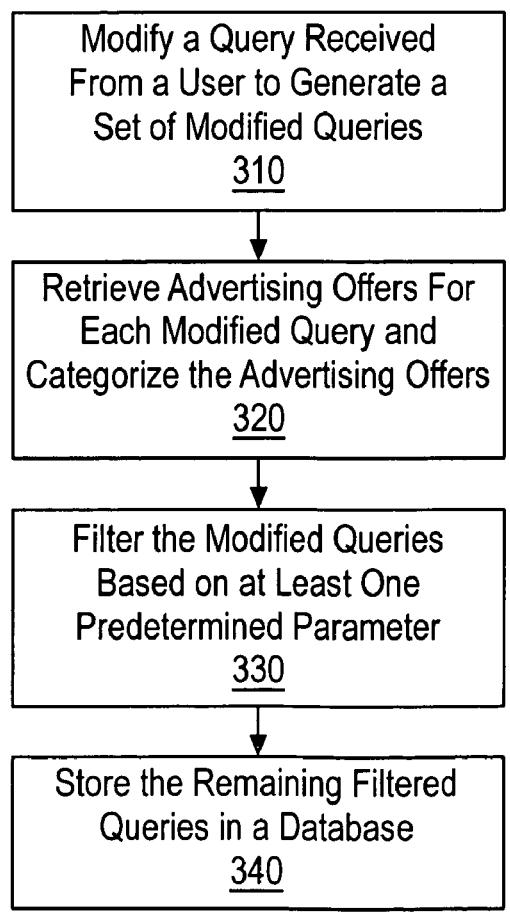
FIG. 3 is a flow diagram illustrating a method to facilitate expansion, disambiguation, and optimization of search queries over a network, according to one embodiment of the invention.

FIG. 3 is a flow diagram illustrating a method to facilitate expansion, disambiguation, and optimization of search queries over a network, according to one embodiment of the invention. As illustrated in FIG. 3, at processing block 310, a search query received from a user is modified to generate a set of modified search queries, as described in further detail in connection with FIG. 4. At processing block 320, advertising offers are retrieved for each modified query and are further categorized based on one or more parameters, as described in further detail in connection with FIG. 5. At processing block 330, the modified search queries are filtered according to the corresponding categorized advertising offers. Finally, at processing block 340, the remaining filtered search queries are stored in a database, such as, for example, database 110 and/or database 112.

Figure 4:
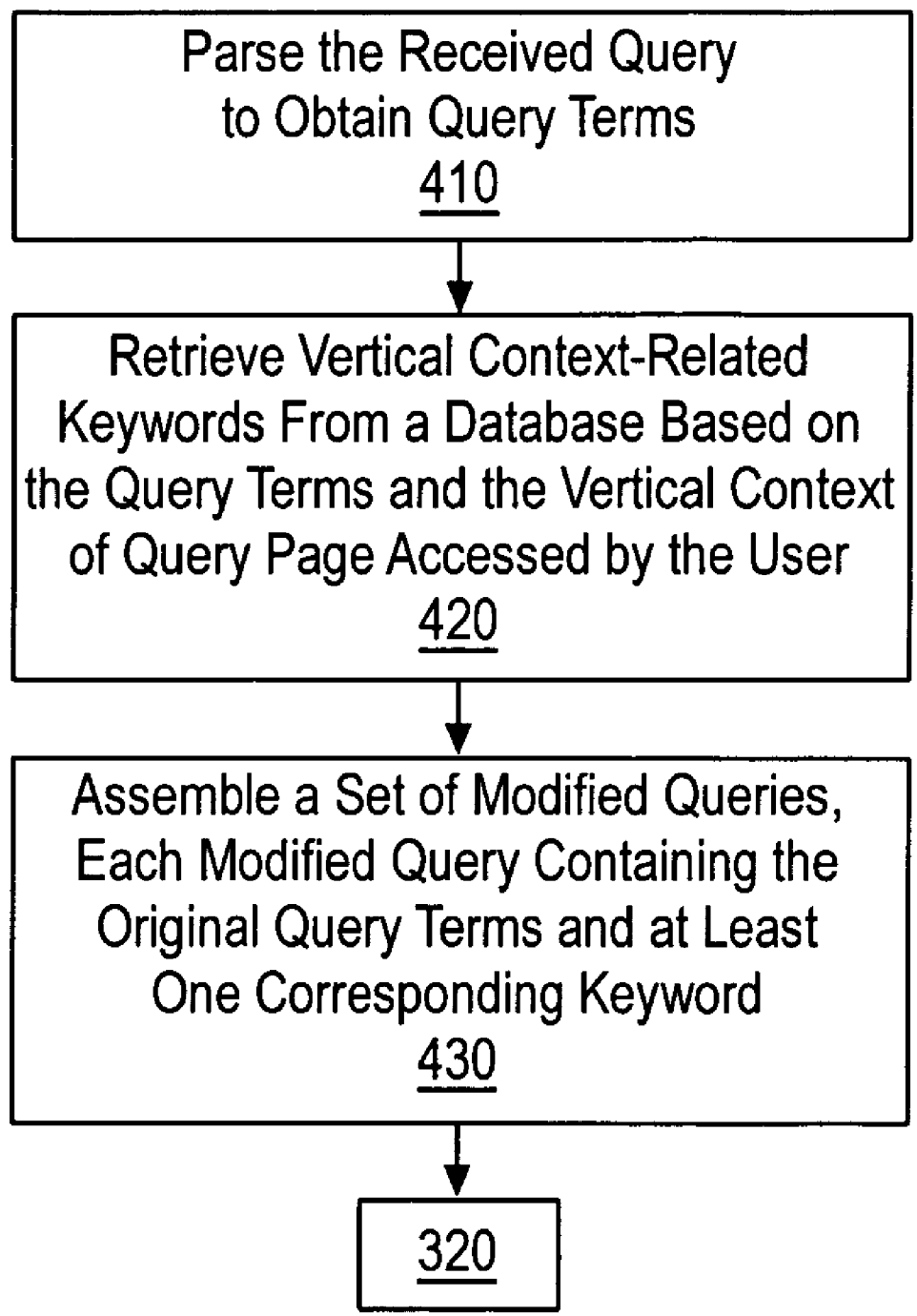
FIG. 4 is a flow diagram illustrating a method to modify and expand a search query using context-related keywords, according to one embodiment of the invention.

FIG. 4 is a flow diagram illustrating a method to modify a search query using context-related keywords and to generate a set of modified queries, according to one embodiment of the invention. As shown in FIG. 4, at processing block 410, the search query is parsed to obtain one or more query terms. In one embodiment, the search servers 106 receive the search query from the client machine 132 via the network 120 and parse the search query to obtain relevant query terms.

At processing block 420, vertical context-related keywords are retrieved from the database 110 based on the query terms and any context of the query page accessed by the user. In one embodiment, the search servers 106 access the corresponding tables 210, 220, 230 within the database 110 and retrieve any keywords related contextually to the parsed query terms and to the context of the query page accessed by the user. If the query page is a generic search page, the search servers 106 match one or more of the query terms to appropriate keywords within the context-related keyword table 230. Otherwise, if the query page is context-specific and pertains to a page category stored within the page category tables 210, such as, for example, a music-related web page, the search servers 106 match one or more of the query terms to appropriate keywords within the context-related keyword table 230 and, in addition, match the page category with any additional music-related keywords. In one embodiment, each retrieved keyword and each query term pertain to a common subject matter related to the page category associated with the query page.

At processing block 430, a set of modified queries is assembled, each modified query containing the original query terms and one or more of the retrieved keywords. In one embodiment, the search servers 106 combine the original query terms with one or more keywords to generate associated modified queries. Considering, for example, an original query containing the query term "MADONNA," which yields multiple music-related keywords, such as "album," "CD," "DVD," "song," an exemplary set of modified queries may include Query 1: (MADONNA, album)
Query 2: (MADONNA, CD)
Query 3: (MADONNA, DVD)
Query 4: (MADONNA, song)

In one embodiment, the set of modified queries is subsequently transmitted to the advertising servers 108. Alternatively, the set of modified queries may reside at the search servers 106 and the advertising servers 108 may access the modified queries for further processing.

Figure 5:
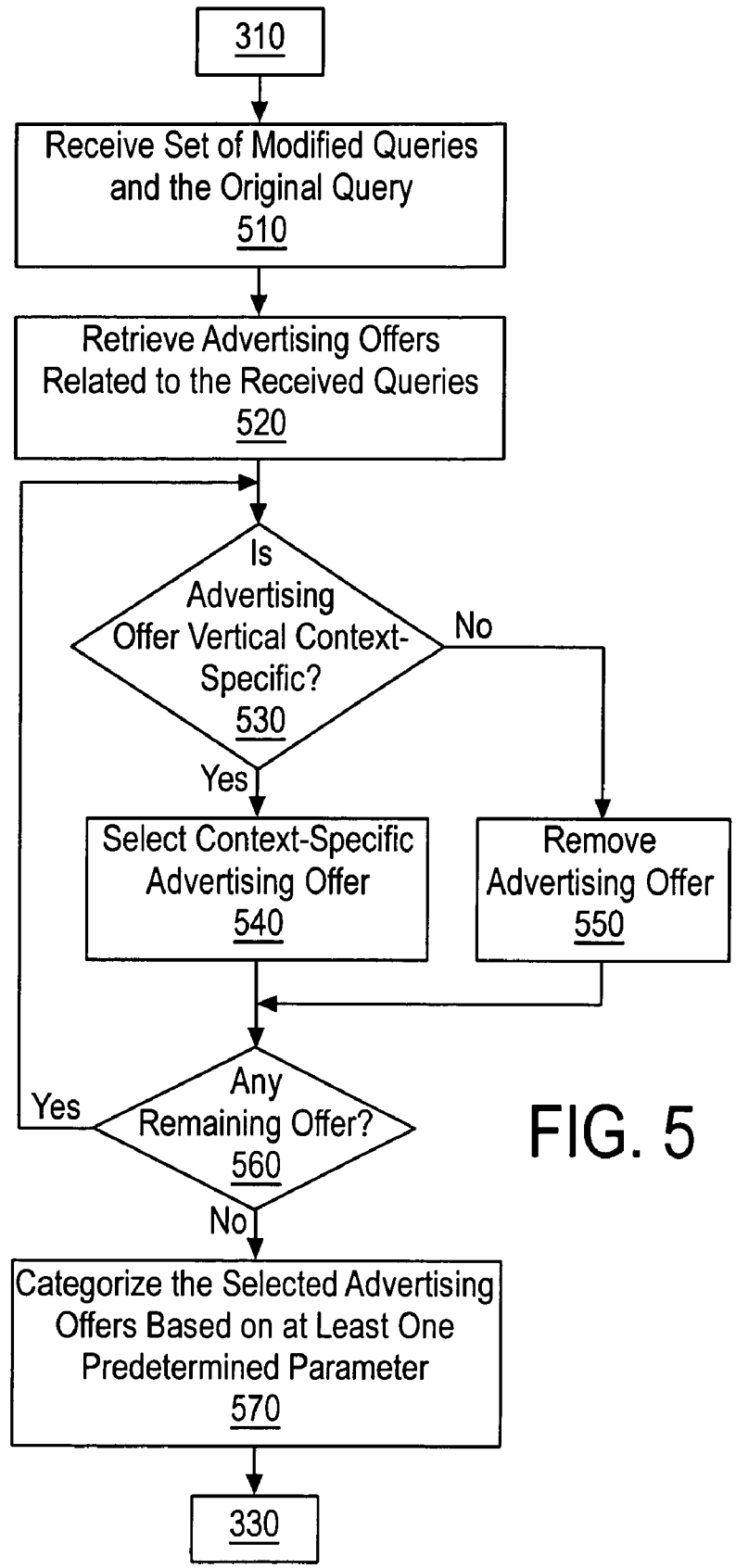
FIG. 5 is a flow diagram illustrating a method to categorize advertising offers related to the modified search queries, according to one embodiment of the invention.

FIG. 5 is a flow diagram illustrating a method to categorize advertising offers related to the modified search queries, according to one embodiment of the invention. As shown in FIG. 5, at processing block 510, the set of modified queries and the original query are received. In one embodiment, the advertising servers 108 receive the modified queries and the original query from the search servers 106. Alternatively, the advertising servers 108 may only receive a notification that a set of queries are available for processing and, as a result, may access the search servers 106 to retrieve the modified queries and the original query.

At processing block 520, advertising offers related to the received queries are retrieved. In one embodiment, the advertising servers 108 access the corresponding database 112 and retrieve advertising offers corresponding to the original query and to each modified query.

Typically, advertiser entities connect to the entity 100 via the network 120 and the communication servers 104 and store various advertising offers within the database 112. To create an advertising offer, the advertiser specifies a rate to be paid for every user who clicks through from the web search page associated with the entity 100 to the web site associated with the advertiser and further bids for one or more unique keywords or keyword phrases relevant to that advertiser. If the bid is accepted, either automatically or through an editor associated with the entity 100, the advertising offer is created and stored within the database 112.

At processing block 530, a decision is made whether each advertising offer is a vertical context-specific offer, such as, for example, a music-related advertising offer. In one embodiment, the advertising servers 108 review each retrieved advertising offer to determine if the respective advertising offer refers to specific content material related to the context of the query terms and any retrieved keywords.

If the advertising offer is context-specific, then, at processing block 540, the context-related advertising offer is selected for further processing. In one embodiment, the advertising servers 108 select the advertising offers that relate to the context of the query web page, such as, for example, the music-related advertising offers. Otherwise, if the advertising offer is not context-specific, then at processing block 550, the advertising offer is removed. In one embodiment, the advertising servers 108 eliminate any generic advertising offers or advertising offers that are not vertically-related with the context of the query web page.

At processing block 560, a decision is made whether there are any remaining offers to be analyzed. In one embodiment, if additional offers are available for review, then the procedure jumps back to processing block 530 and blocks 530 through 550 are repeated. Otherwise, at processing block 570, the selected advertising offers are further optimized. In one embodiment, the advertising servers 108 optimize the selected context-related advertising offers based on one or more predetermined parameters.

In one embodiment, the advertising servers 108 optimize the advertising offers according to a "pay-per-click" (PPC) categorization parameter, which measures the rate advertisers are willing to pay for every click onto a displayed ad. Alternatively, the advertising servers 108 may optimize advertising offers according to a combination between the PPC categorization parameter and a "click-through-rate" (CTR) categorization parameter, which is calculated by dividing the number of users who clicked on an ad displayed on a web page by the number of times (impressions) the ad was delivered and displayed for the user. In yet another embodiment, the advertising servers 108 may optimize the selected advertising offers based on a relevance categorization parameter, which measures the relevance of a selected advertising offer to the original search query and the set of modified queries.

Subsequently, as shown at processing block 330 in FIG. 3, the modified queries are further filtered based on the selected context-related advertising offers. In one embodiment, the search servers 106 receive the context-related advertising offers from the advertising servers 108, select only the modified queries associated with the context-related advertising offers, and filter out or discard the other modified queries. The selected modified queries are thus disambiguated for subsequent storage in the database 110.

Figure 6:
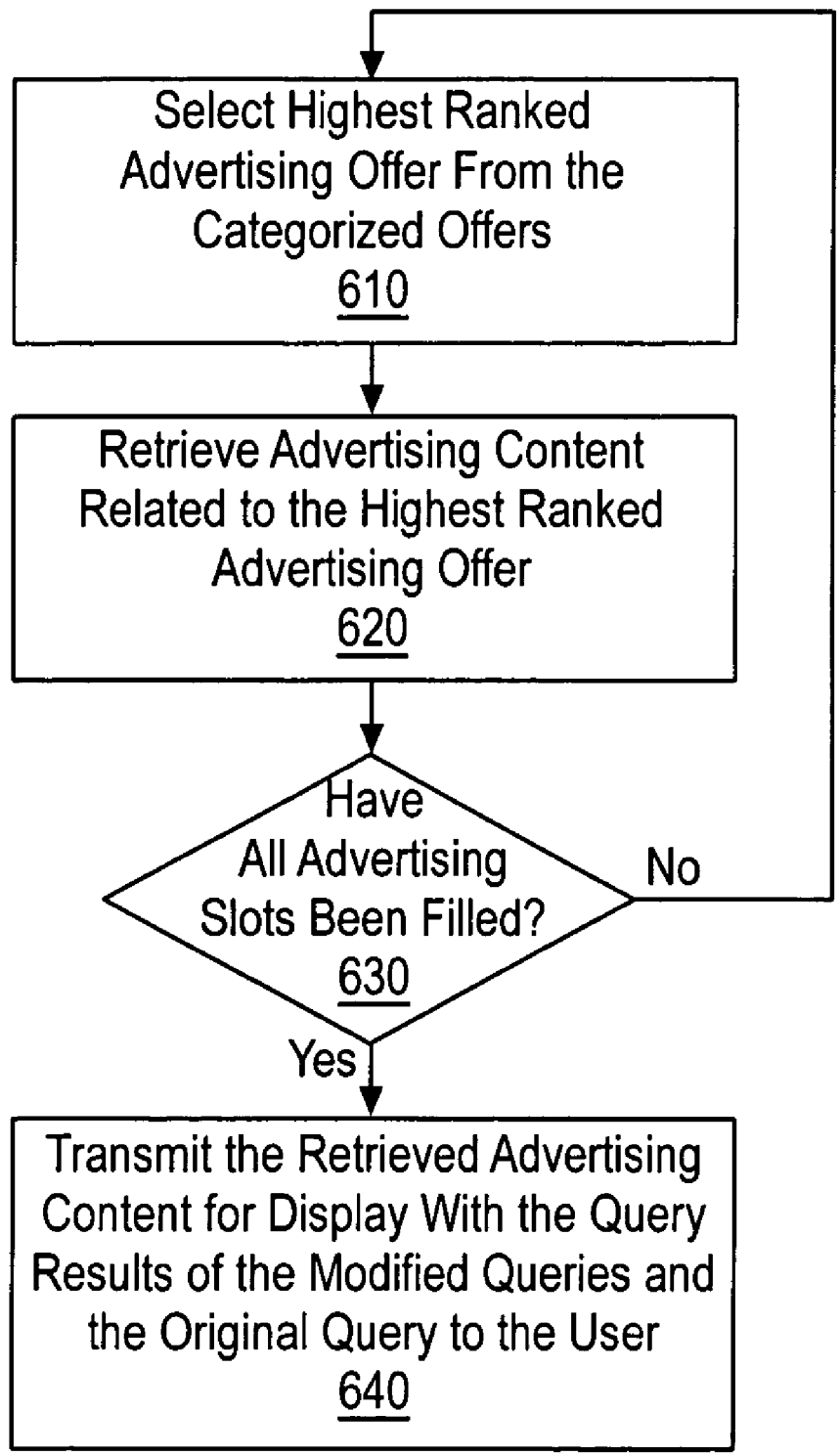
FIG. 6 is a flow diagram illustrating a method to optimize the selection of advertising content for the modified search queries, according to one embodiment of the invention.
Figure 10:
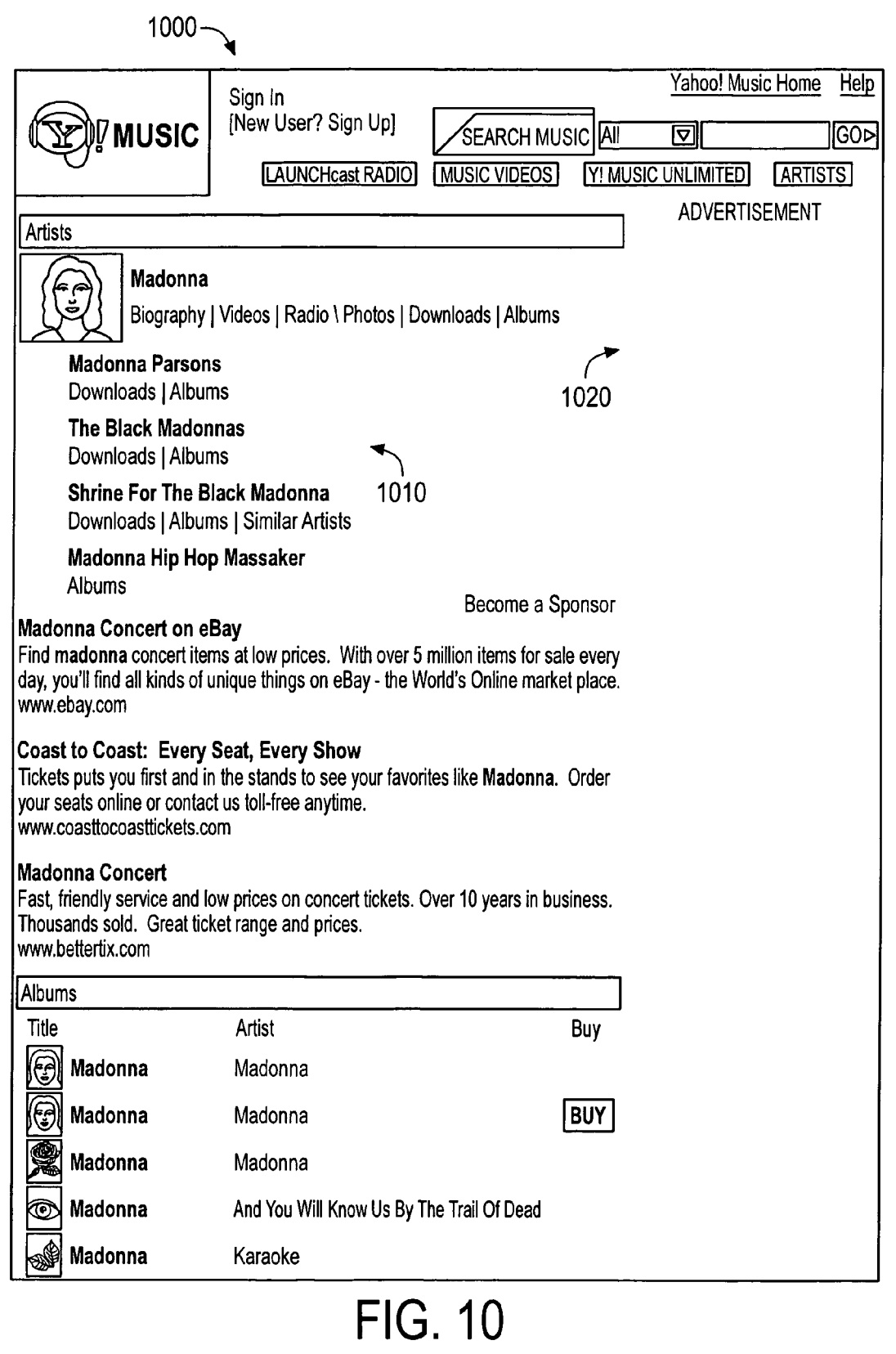

FIG. 6 is a flow diagram illustrating a method to optimize the selection of advertising content for the modified search queries, according to one embodiment of the invention. FIG. 10 illustrates an exemplary interface to facilitate expansion, disambiguation, and optimization of search queries over the network.

As shown in FIG. 6, at processing block 610, the highest ranked advertising offer is selected from the categorized and optimized offers. In one embodiment, if prompted by a request from a user, such as, for example, a search query entered by a user, the advertising servers 108 categorize and optimize the advertising offers, as described in detail in connection with FIG. 5, and select the highest ranked advertising offer. The highest ranked advertising offer may, in one embodiment, be the highest rate that advertisers are wiling to pay for each click.

At processing block 620, advertising content related to the highest ranked advertising offer is retrieved. In one embodiment, the advertising servers 108 access the database 112 and retrieve advertising content information related to the highest ranked advertising offer. In one embodiment, the advertising content information includes advertisements related to a particular entity which placed the corresponding advertising offer. Alternatively, the advertising content information may include one or more sponsor links related to the advertising entity, one or more integrated links, or other content that enables access to the advertising entity through a conventional mouse click command performed by the user.

At processing block 630, a decision is made whether all the advertising slots will be filled on a results web page 1000 shown in FIG. 10. The results web page 1000 includes a results interface area 1010 containing the query results displayed for the user and an advertising interface area 1020 containing the advertising content displayed in successive advertising slots.

If the slots will be filled with the retrieved advertising content, then at processing block 640, the retrieved advertising content is transmitted to the client machine 132 with the query results for subsequent display in the respective interface areas 1010, 1020 of the results web page 1000. Otherwise, if additional slots are available in the advertising interface area 1020, the procedure jumps back to processing block 610 and blocks 610-630 are repeated.

Figure 7:
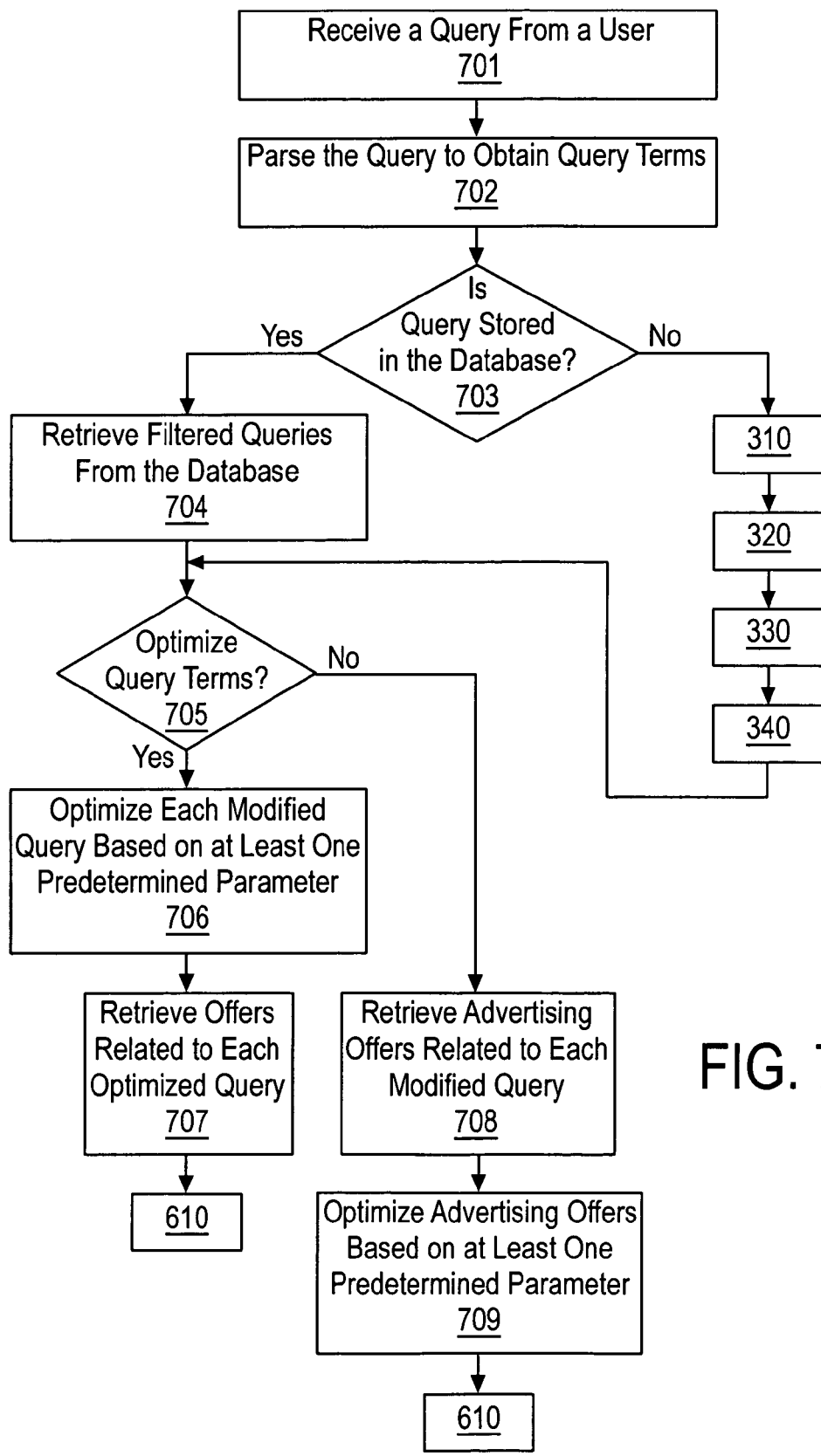
FIG. 7 is a flow diagram illustrating a real-time method to facilitate expansion, disambiguation, and optimization of search queries over a network, according to one embodiment of the invention.
Figure 8:

FIG. 7 is a flow diagram illustrating a real-time method to facilitate expansion, disambiguation, and optimization of search queries over a network, according to one embodiment of the invention. FIGS. 8-9 illustrate exemplary interfaces to facilitate expansion, disambiguation, and optimization of search queries over the network.

As illustrated in FIG. 7, at processing block 701, a search query is received from a user. In one embodiment, a user connects to the network 120 through the client program 130 running on the client machine 132 and accesses the entity 100.

The user communicates with the entity 100 via the network 120 and requests a particular web page. The page servers 102 within the entity 100 receive the page request, retrieve the page from an associated database, such as, for example, database 110, using the search servers 106, and transmit the requested page to the user, the page being displayed on the client machine 132 associated with the user. Alternatively, the web page may be populated with pictures transmitted by front end picture servers (not shown) and/or content transmitted by front end content servers (not shown). In one embodiment, the requested page is an exemplary generic search page, such as the interface 800 shown in FIG. 8. Alternatively, the requested page may be an exemplary context-specific page, such as, for example, a music-related web page shown in FIG. 9 as the interface 900.

In one embodiment, the user enters a search query in respective search fields 810, 910, and transmits the search query to the entity 100 by selecting a respective interface button 820, 920 with a conventional mouse click command.

At processing block 702, the query is parsed to obtain one or more query terms. In one embodiment, the search servers 106 within the entity 100 receive the query and use parsing functions to parse the query into specific query terms or combinations of query terms.

At processing block 703, a decision is made whether the parsed query terms are stored in the database 110. In one embodiment, the search servers 106 access the database 110 and search the filtered queries stored in the database 110, as described above in connection with FIG. 3, for stored query terms matching the parsed query terms.

If matching query terms are found in the database 110, then at processing block 704, the filtered queries are retrieved from the database 110. In one embodiment, the search servers 106 retrieve the filtered queries corresponding to the parsed query terms received from the user from the database 110.

Otherwise, if no matching query terms are found, the procedure performs blocks 310 through 340, as detailed in connection with FIGS. 3 through 5, and then jumps to processing block 705. In one embodiment, the search servers 106 within the entity 100 use search functions to access the database 110 and to retrieve keywords related to the parsed query terms and/or to the context of the web page, as described in detail above in connection with FIG. 4. Next, the search servers 106 use query generation functions to generate one or more modified queries, each modified query containing one or more query terms and one or more corresponding keywords. Then, the search servers 106 transmit the modified queries and the original query to the advertising servers 108. Alternatively, the advertising servers 108 may access and retrieve the modified queries and the original query from the search servers 106.

The advertising servers 108 within the entity 100 use retrieval functions to access the database 112 and to retrieve advertising offers that match either one of the modified queries or the original query. The advertising servers further use selection and categorization functions to select pertinent advertising offers and to categorize the selected offers, as described in detail above in connection with FIG. 5.

Next, the search servers 106 use filtering functions to filter the modified search queries according to the corresponding categorized advertising offers. Finally, the search servers 106 update the database 110 by storing a copy of the remaining filtered search queries in the database 110.

Referring back to FIG. 7, at processing block 705, a decision is made whether the query terms within the filtered queries need to be optimized. In one embodiment, the search servers 106 analyze the filtered queries that contain the parsed query terms from the original query received from the user, and decide whether the query terms need to be optimized according to one of many known optimization techniques.

If the query terms need to be optimized, then at processing block 706, each modified filtered query is optimized based on one or more predetermined parameters, such as, for example, according to a relevance parameter, according to a "pay-per-click" (PPC) categorization parameter, or according to a combination between the PPC categorization parameter and a "click-through-rate" (CTR) parameter. In one embodiment, the search servers 106 use optimization functions to optimize each filtered query retrieved from the database 110.

Next, at processing block 707, advertising offers related to each optimized query are retrieved from the database 112. In one embodiment, the advertising servers 108 receive the optimized queries and use retrieval functions to retrieve advertising offers related to each optimized query from the database 112. The procedure then continues with processing block 610, et seq., described above in connection with FIG. 6.

If the query terms need not be optimized, then at processing block 708, advertising offers related to each filtered query are retrieved from the database 112. In one embodiment, the advertising servers 108 receive the filtered queries and use retrieval functions to retrieve advertising offers related to each filtered query from the database 112. At processing block 709, each retrieved advertising offer is optimized based on one or more predetermined parameters, such as, for example, according to a relevance parameter, according to a "pay-per-click" (PPC) categorization parameter, or according to a combination between the PPC categorization parameter and a "click-through-rate" (CTR) parameter. In one embodiment, the advertising servers 108 use optimization functions to optimize each advertising offer retrieved from the database 112. The procedure then continues with processing block 610, et seq., described above in connection with FIG. 6.

Figure 11:
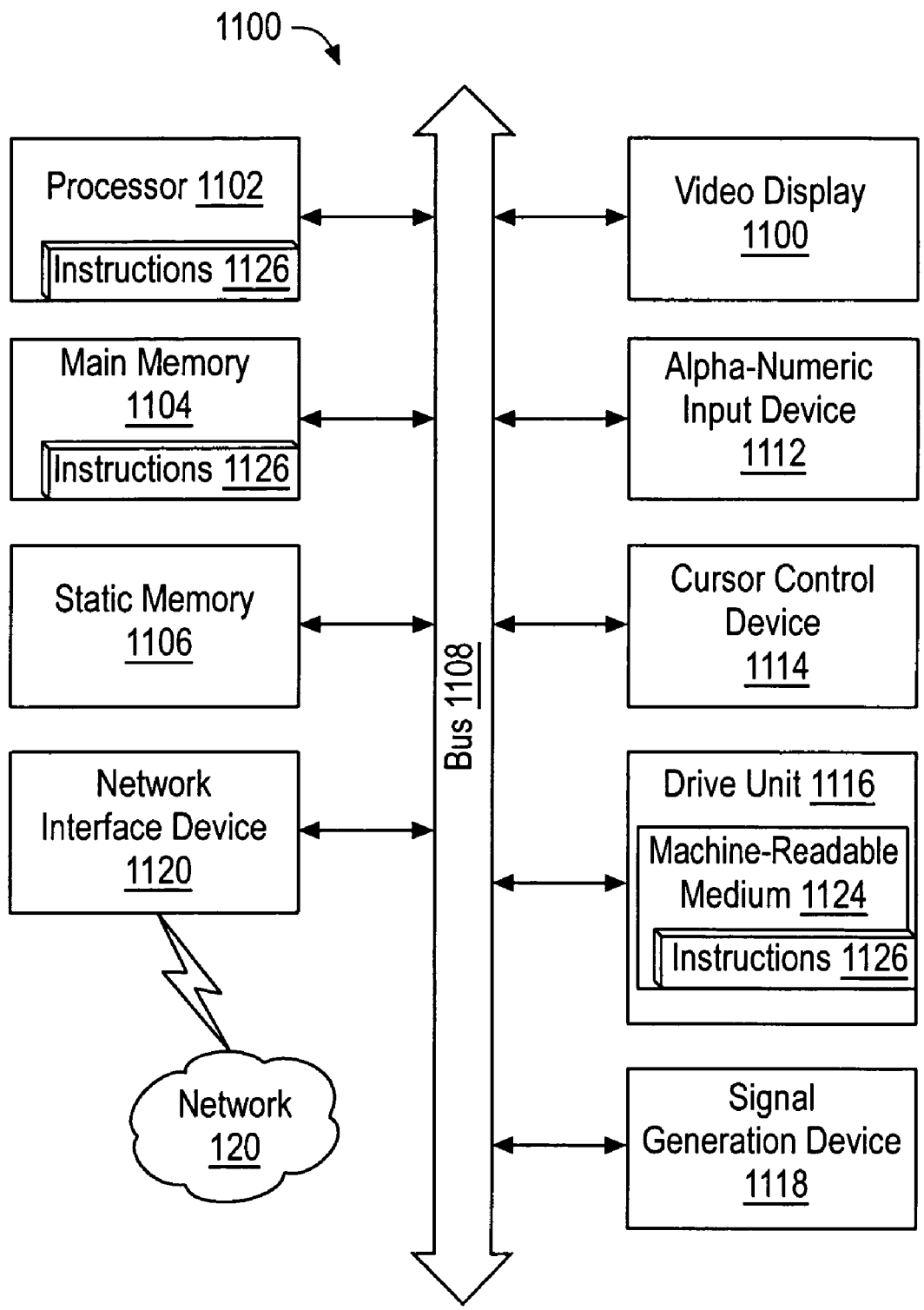
FIG. 11 is a diagrammatic representation of a machine in the exemplary form of a computer system within which a set of instructions may be executed.

FIG. 11 shows a diagrammatic representation of a machine in the exemplary form of a computer system 1100 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1100 includes a processor 1102, a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a disk drive unit 1116, a signal generation device 1118 (e.g., a speaker), and a network interface device 1120.

The disk drive unit 1116 includes a machine-readable medium 1124 on which is stored a set of instructions (i.e., software) 1126 embodying any one, or all, of the methodologies described above. The software 1126 is also shown to reside, completely or at least partially, within the main memory 1104 and/or within the processor 1102. The software 1126 may further be transmitted or received via the network interface device 1120.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   parsing, in a computer, an original search query received from a user over a network through a query web page to obtain at least one query term;
   retrieving a plurality of keywords from a database related contextually to a category of said query web page and said at least one query term;
   generating, in a computer, a set of modified queries, each modified query comprising said at least one query term and at least one keyword of said plurality of keywords;
   retrieving, in a computer, a plurality of advertising offers for each modified query and for said original query;
   removing, in a computer, any advertising offer that is not related contextually to said category of said query web page; and
   ranking, in a computer, the advertising offers not removed based on at least one predetermined parameter.

2. The method according to claim 1, wherein each keyword and said at least one query term pertain to a common subject matter related to said page category.

3. The method according to claim 1, further comprising:
   selecting advertising offers related contextually to said at least one query term and said plurality of keywords; and
   filtering said set of modified queries and said original query to generate a plurality of filtered queries, each filtered query corresponding to at least one selected advertising offer.

4. The method according to claim 1, wherein:
   said at least one predetermined parameter further comprises a "pay-per-click" (PPC) categorization parameter.

5. The method according to claim 1, wherein:
   said at least one predetermined parameter further comprises a combination between a "pay-per-click" (PPC) categorization parameter and a "click-through-rate" (CTR) categorization parameter.

6. The method according to claim 1, wherein:
   said at least one predetermined parameter further comprises a relevance categorization parameter.

7. A system comprising:
   a server, comprising a processor and memory, for:
      parsing an original search query received from a user over a network through a query web page to obtain at least one query term;
      retrieving a plurality of keywords from a database related contextually to a category of said query web page and said at least one query term;
      generating a set of modified queries, each modified query further comprising said at least one query term and at least one keyword of said plurality of keywords;
      retrieving a plurality of advertising offers for each modified query and for said original query;
      removing, in a computer, any advertising offer that is not related contextually to said category of said query web page; and
      ranking, in a computer, the advertising offers not removed based on at least one predetermined parameter.

8. The system according to claim 7, wherein each keyword and said at least one query term pertain to a common subject matter related to said page category.

9. The system according to claim 7, said server further for:
   selecting advertising offers related contextually to said at least one query term and said plurality of keywords; and
   filtering said set of modified queries and said original query to generate a plurality of filtered queries, each filtered query corresponding to at least one selected advertising offer.

10. The system according to claim 7, wherein:
    said at least one predetermined parameter further comprises a "pay-per-click" (PPC) categorization parameter.

11. The system according to claim 7, wherein:
    said at least one predetermined parameter further comprises a combination between a "pay-per-click" (PPC) categorization parameter and a "click-through-rate" (CTR) categorization parameter.

12. A computer readable medium containing executable instructions, which, when executed in a processing system, cause the processing system to perform a method comprising:
    parsing an original search query received from a user over a network through a query web page to obtain at least one query term;
    retrieving a plurality of keywords from a database related contextually to a category of said query web page and said at least one query term;
    generating a set of modified queries, each modified query further comprising said at least one query term and at least one keyword of said plurality of keywords;
    retrieving a plurality of advertising offers for each modified query and for said original query;
    removing, in a computer, any advertising offer that is not related contextually to said category of said query web page; and
    ranking, in a computer, the advertising offers not removed based on at least one predetermined parameter.

13. The computer readable medium according to claim 12, wherein each keyword and said at least one query term pertain to a common subject matter related to said page category.

14. The computer readable medium according to claim 12, further comprising:
    selecting advertising offers related contextually to said at least one query term and said plurality of keywords; and
    filtering said set of modified queries and said original query to generate a plurality of filtered queries, each filtered query corresponding to at least one selected advertising offer.

15. The computer readable medium according to claim 12, wherein:
    said at least one predetermined parameter further comprises a "pay-per-click" (PPC) categorization parameter.

16. The computer readable medium according to claim 12, wherein:
    said at least one predetermined parameter further comprises a combination between a "pay-per-click" (PPC) categorization parameter and a "click-through-rate" (CTR) categorization parameter.

17. The computer readable medium according to claim 12, wherein:
    said at least one predetermined parameter further comprises a relevance categorization parameter.

* * * * *